US011437939B2

(12) United States Patent
Dixon

(10) Patent No.: US 11,437,939 B2
(45) Date of Patent: Sep. 6, 2022

(54) CONTROL OF ELECTRIC MOTORS

(71) Applicant: TRW Limited, Solihull (GB)

(72) Inventor: Christopher David Dixon, West Midlands (GB)

(73) Assignee: ZF Automotive UK Limited

(*) Notice: Subject to any disclaimer, the term of this patent is extended or adjusted under 35 U.S.C. 154(b) by 874 days.

(21) Appl. No.: 14/653,361

(22) PCT Filed: Dec. 17, 2013

(86) PCT No.: PCT/GB2013/053325
§ 371 (c)(1),
(2) Date: Jun. 18, 2015

(87) PCT Pub. No.: WO2014/096807
PCT Pub. Date: Jun. 26, 2014

(65) Prior Publication Data
US 2015/0349682 A1 Dec. 3, 2015

(30) Foreign Application Priority Data
Dec. 21, 2012 (GB) .................... 1223174

(51) Int. Cl.
*H02P 6/22* (2006.01)
*H02P 6/04* (2016.01)
(Continued)

(52) U.S. Cl.
CPC .............. *H02P 6/14* (2013.01); *H02P 6/32* (2016.02); *H02P 6/34* (2016.02); *H02P 21/00* (2013.01); *H02P 21/22* (2016.02); *H02P 27/08* (2013.01)

(58) Field of Classification Search
CPC ............ H02P 27/08; H02P 21/22; H02M 1/14
(Continued)

(56) References Cited

U.S. PATENT DOCUMENTS 4,989,128 A * 1/1991 Ohyama ........... H02M 7/53873
363/132
6,281,656 B1 * 8/2001 Masaki ..................... H02P 6/18
318/700
(Continued)

FOREIGN PATENT DOCUMENTS

CN 1689220 A 10/2005
CN 101326707 A 12/2008
(Continued)

OTHER PUBLICATIONS

Patent Act 1977: Search Report under Section 17(5), Application No. GB1223174.2 dated May 4, 2013.
(Continued)

*Primary Examiner* — Muhammad S Islam
*Assistant Examiner* — Charles S Laughlin
(74) *Attorney, Agent, or Firm* — Robert James Harwood

(57) ABSTRACT

A control system for a multiphase electric motor comprises processing means arranged to determine a pattern of PWM voltage waveforms to be applied to respective phases of the motor, the processing means assigning different PWM patterns for use with different motor positions. In use for a given rotational position of the motor the processing means is normally adapted to apply PWM waveforms according to the assigned PWM pattern unless a different PWM pattern is currently in use at that time, except that in the event that the demanded voltage waveforms cannot be achieved with the current PWM pattern the processing means is adapted to force the PWM pattern to change. Upon the rotor moving into a different position associated with a different assigned pattern the processing means forces the PWM pattern to change to the assigned PWM pattern.

15 Claims, 9 Drawing Sheets

(51) Int. Cl.
*H02P 6/14* (2016.01)
*H02P 6/32* (2016.01)
*H02P 21/00* (2016.01)
*H02P 27/08* (2006.01)
*H02P 21/22* (2016.01)
*H02P 6/34* (2016.01)

(58) Field of Classification Search
USPC .................. 318/400.02, 599, 129, 567, 162
See application file for complete search history.

(56) References Cited

U.S. PATENT DOCUMENTS

| | | | |
|---|---|---|---|
| 7,015,664 B2 | 3/2006 | Coles et al. | |
| 7,461,832 B2 | 12/2008 | Zhang | |
| 7,688,018 B2 | 3/2010 | Goto et al. | |
| 8,421,394 B2 | 4/2013 | Schmitt et al. | |
| 8,981,703 B2 | 3/2015 | Bosch | |
| 2005/0269982 A1* | 12/2005 | Coles | H02P 6/185 318/400.05 |
| 2007/0069676 A1* | 3/2007 | MacKay | H02P 6/182 318/400.11 |
| 2009/0167223 A1* | 7/2009 | Goto | H02P 6/14 318/400.17 |
| 2009/0277343 A1* | 11/2009 | Ghimire | B26D 3/20 99/537 |
| 2010/0072980 A1* | 3/2010 | Schmitt | H02M 7/53875 324/86 |
| 2011/0012544 A1* | 1/2011 | Schulz | B60L 15/025 318/400.02 |
| 2012/0074888 A1 | 3/2012 | Maekawa | |
| 2013/0043821 A1 | 2/2013 | Bosch | |

FOREIGN PATENT DOCUMENTS

| | | |
|---|---|---|
| CN | 101573862 A | 11/2009 |
| CN | 102783010 A | 11/2012 |
| GB | 2490848 A | 11/2012 |
| KR | 1020070007279 A | 1/2007 |
| WO | 2004023639 A1 | 3/2004 |

OTHER PUBLICATIONS

PCT International Search Report and the Written Opinion, Application No. PCT/GB/2013/053325 filed Dec. 17, 2013, dated Nov. 24, 2014.

Notification of the Third Chinese Office Action, Application No. CN201380066791.1, dated May 21, 2018.

* cited by examiner

CONTROL OF ELECTRIC MOTORS

CROSS-REFERENCE TO RELATED APPLICATIONS

Application No. PCT/GB2013/053325 filed Dec. 17, 2013, the disclosures of which are incorporated herein by reference in entirety, and which claimed priority to Great Britain Patent Application No. 1223174.2 filed December. This application is a national stage of International 21, 2012, the disclosures of which are incorporated herein by reference in entirety.

BACKGROUND OF THE INVENTION

The present invention relates to the control of electric motors, and in particular to pulse width modulation (PWM) control of multiple phase brushless motors.

In order to control a brushless electric motor it is necessary to determine the position of the rotor of the motor so that the current through the motor phase windings can be controlled to produce the desired torque. The position can be measured using a dedicated position sensor or by estimating the position from other parameters using a position sensorless control scheme.

PWM control is typically implemented using a closed loop current controller of the kind shown in FIG. 1. Using space vector modulation (SWM) control in response to a requested target current, a voltage is applied to each phase winding of the motor and the resultant generated currents measured or estimated. The individual phase currents are then used by a controller, typically a PI controller, to generate the required Pulse width modulated phase voltages to achieve the target current. The estimated position of the motor is used to ensure that the phase voltages can be applied to the correct phases at the correct times.

Typically for a 3 phase motor the driver comprises a 6 FET bridge arranged to apply the desired voltages to the motor phase terminals in a PWM pattern to achieve the desired phase currents. Using six switches, each of which can be opened or closed, there are eight possible states for the switches of the bridge, two so called zero voltage states and six active states. The PWM pattern is constructed using Space Vector Modulation by combining, within each modulation period one or more active states with one or more of the zero states in a defined PWM pattern. Other non-SVM techniques are also taught in the literature.

A wide discussion of different motor control schemes is provided in the applicants earlier application, PCT/GB2003/0023639A1. That document teaches the use of specific PWM patterns that include one or more test periods where the current flowing in the motor can be measured. Using two appropriate test periods it is possible to estimate the current in all three phases. The document also teaches a refinement in which the inductance of the motor can be determined from the current measurements, again requiring the provision of appropriate test periods. It is known that inductance varies with motor position, and so by determining the inductance the position of the motor can be estimated. The teaching of that document is incorporated herein by reference in entirety.

A number of suitable "types" of PWM pattern exist, each type of pattern being defined by one or more characteristic features of the PWM waveforms applied to each phase of the motor. Generally PWM modulation patterns fall into three main types: centre aligned PWM in which the centre of each pulse is aligned with the centre of the modulation period and both leading and trailing edges are modulated, trailing edge PWM in which the leading edges of the pulses are all aligned with the start of the period and the trailing edges are modulated, and leading edge PWM in which the trailing edges are aligned with the end of the period and the leading edges are modulated.

As already mentioned, in order to enable the appropriate current measurements to be made each of the three basic types of PWM pattern of the PWM strategy may be modified by shifting the fixed edges or centre of the pulses to ensure that within each PWM period there exists states suitable test periods of time.

FIG. 2 shows a suitable set of six different PWM patterns of the trailing edge modulation type. As can be seen, the position of the leading edges is fixed allowing the trailing edges to be modulated. Each of the leading edges occurs before any trailing edge, defining two test periods, one period between the first and second leading edges and the other period between the second and third leading edges in which current measurements can be made. The spacing between the leading edges is chosen to give enough time for the output of the current sensor used to make the measurements to settle to a steady state.

The need to allow for the time for the current sensor to settle dictates how far the fixed leading edges must be shifted in this PWM type from a simple PWM type where all leading edges are aligned with the start of the PWM period. This shifting reduces the maximum modulation that can be achieved whilst retaining the pattern. In a typical control scheme, one of the patterns from the set will be used all the time, with a different pattern only being chosen if the preferred pattern cannot be used to assemble the SVM vectors. This simplifies the algorithm used to allocate the vectors to the pattern.

BRIEF SUMMARY OF THE INVENTION

According to a first aspect the invention provides a control system for a multiphase electric motor comprising processing means arranged to monitor electrical currents in the motor and the rotational position of the motor and to determine therefrom a duty cycle for PWM voltage waveforms to be applied to each phase of the motor, the PWM voltage waveforms being arranged in a PWM pattern, characterised in that:

the processing means assigns different PWM patterns for use with different positions or with a range of different rotor positions of the motor, and whereby in use for a given rotational position or range of rotational positions of the motor the processing means is normally adapted to apply PWM waveforms according to the assigned PWM pattern unless a different PWM pattern is currently in use at that time, except that in the event that the demanded voltage waveforms cannot be achieved with the current PWM pattern the processing means is adapted to force the PWM pattern to change; and further in which upon the rotor moving into one of the different positions or range of positions associated with a different assigned pattern the processing means is adapted to force the PWM pattern to change to the assigned PWM pattern.

The processing means may be arranged to use a vector control strategy to determine a number of vector states for use in each phase within a PWM period and to determine if the assigned PWM pattern for that position can be used to assemble the determined vector states, and in the event that it determines that the assigned PWM pattern can be used, the processing means may allocate the PWM pattern assigned to the rotor position unless the PWM pattern currently used is different in which case it will continue to use that different pattern until the rotor reaches a different position or range of positions.

The processing means may be arranged so that it does not switch back to the assigned PWM pattern, when it is currently using a different PWM pattern it has previously been forced to switch to, unless it is forced to switch to the assigned PWM pattern because the demanded voltage waveforms require such as change of pattern. Thus, changes of pattern may only occur when forced due to the demanded voltages or on the rotor moving into a new range of positions. Any other unnecessary changes of pattern will be restricted.

The control system of the invention allocates PWM patterns which are assigned according to rotor position unless it is unable to do so and a different pattern must be chosen, yet when the voltages again return to ones where the assigned PWM pattern could be allocated it does not force a change of pattern but retains the current pattern until the rotor has moved to a position to which a different pattern has been assigned. In this way an unnecessary change in PWM pattern which would occur if the processing means always used the assigned PWM pattern whenever possible is avoided. Changes will then only occur when they are forced, either by increasing demanded motor current or when the rotor position has changed.

The applicant has appreciated that for any given rotor position, the choice of which PWM pattern from a set of patterns to use is arbitrary when only low motor torques are required. This is because any given PWM pattern can be used to assemble the SVM states that are demanded using space vector modulation (SVM).

However, at higher demanded motor torques it may not be possible to use all of the PWM patterns to provide the required waveforms for each phase. If the pattern cannot accommodate the required pulse widths, a move to a different PWM is forced.

The applicant has appreciated that in certain applications, such as electric power steering where the motor is used to apply an assistance torque to a steering apparatus, it is beneficial to continue to use a given PWM pattern for as long as possible. This is because a change to a different PWM pattern can produce unwanted noise, Also, using a different pattern can sometimes lead to slightly different currents and torques which can be felt by the driver through the steering wheel.

The invention therefore does not force a change of PWM pattern if it is not needed to allow for large torques or due to change of position.

The processing means may be arranged to assign a predefined PWM pattern for use when the rotor position lies within a range of absolute motor rotational position angles. This may be measured relative to a fixed datum on the stator of the motor.

The assigned PWM patterns of the set of patterns may be stored in a memory in a look up table together with the corresponding position or range of positions to which each pattern is assigned.

In a preferred arrangement, the processing means divides a complete motor electrical rotation into six equal angle ranges, and assigns a unique PWM pattern to each of the six ranges, normally selecting the assigned pattern whenever the rotor position moves into a range. For a three phase motor, six patterns cover all possible patterns within a given PWM type. Thus, each of the six patterns of the type is used once per full rotation.

In an alternative, the pattern may be changed every 30 degrees, so that each of the six PWM patterns is used twice in a full rotation.

Of course, if desired less than the full six patterns could be used, perhaps as few as two patterns, or three patterns out of the six patterns.

In an alternative the processing means may assign a PWM pattern to a relative range of rotor positions. It may, for example, assign a different pattern every time the rotor moves through a given angle which may not be an integer divisor of a full rotation, such as a 50 degree rotation. It may store a sequence of PWM patterns and move through the sequence as the rotor rotates. A change will be forced whenever the rotor has moved through the given range. A counter may be provided for counting the rotation of the rotor.

A large variety of different patterns of PWM can be used whilst retaining the advantages of the present invention.

The processing means may be adapted to assign patterns in a set sequence, the sequence repeating each time the rotor has rotated through a predetermined angle. For instance, the sequence may repeat once per revolution of the motor or part revolution. In an alternative, a set of patterns may be provided and the processing means may assign a pattern using a random or pseudo random sequence from the set of patterns. Thus, whenever a forced change is made the next one in the sequence, whether set, or random, or pseudo-random, will be selected.

In one preferred arrangement, the processing means may allocate a trailing edge modulated pattern for a given position of range of positions in which a single pulse is applied to each phase in a given PWM period, the duty ratio being defined by the duration of the pulse relative to the PWM period, and in which the leading edges of each pulse are fixed at respective positions within the period, all three leading edges occurring prior to any trailing edges of the pulses and defining between the leading edges test period within which current measurements are taken, the processing means modulating the trailing edge of each pulse. The processing means may vary the duty ratio to control the current flowing in the phase of the motor.

The assigned PWM pattern may provide at least one test period of time within each PWM period within which the current flowing into one phase can be measured. Preferably where the motor is a three phase motor two such periods of time are provided, the processing means being arranged to measure in a first period current that flows into one phases and to measure in a second period the current flowing out of the a second one of the phases, the processing means estimating the current in the remaining phase from the two current measurements.

Providing such a pattern or patterns enables test regions suitable for use in measuring the current flowing through each of the three phases to be made.

The control system may perform a sensorless position determining algorithm which determines the position of the rotor from the currents measured in the test periods. Such an algorithm is known, for example, for PCT/GB2003/0023639A1.

The control system may only allocate PWM patterns which include more than one test period within each PWM period. This allows a test to be made in each period, giving a high resolution for the position measurement that may be made. Alternatively it may assign a mixture of PWM patterns that do not have test periods and PWM patterns that do. The assigned PWM pattern may provide two or more test periods of time within each PWM period within which the current flowing into one phase can be measured.

The control system may include a switching means comprising a plurality of switches arranged in pairs, each pair defining a first switch connecting a phase of the motor to a first voltage, and a second switch connecting the phase to a second, different, voltage, the demanded PWM waveforms being applied to the switches to control the voltages applied to each phase.

According to a further aspect the invention provides in combination an electric motor, a switching means connecting the phases of the motor to an electrical supply and a control system according to the first aspect of the invention, the control system controlling current flowing in the phases of the motor by applying the PWM waveforms to the switches of the switching means.

Other advantages of this invention will become apparent to those skilled in the art from the following detailed description of the preferred embodiments, when read in light of the accompanying drawings.

DETAILED DESCRIPTION OF THE INVENTION

The following example relates to position sensorless control of motors. The present invention is especially suited to such a control strategy but it should be understood that the invention can be used in a system in which a position sensor is provided for measuring position.

Figure 3:
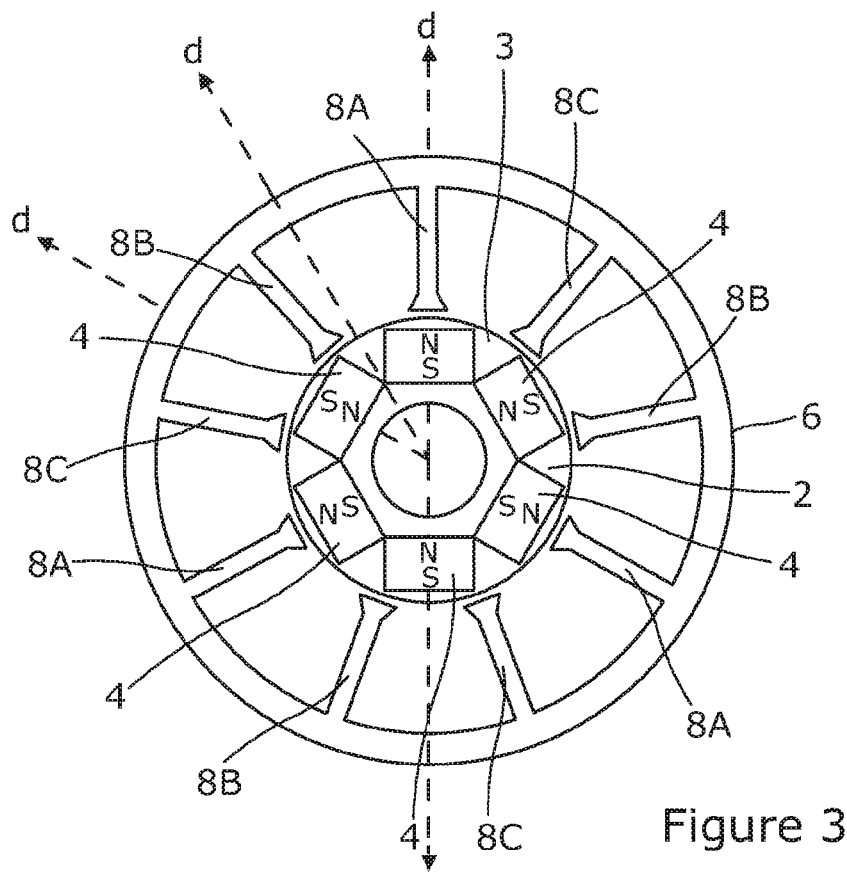
FIG. 3 is a schematic view of a three phase motor that can be controlled by the control system of FIG. 1.

Referring to FIG. 3 a three phase brushless motor 1 by way of example is provided which comprises a rotor 2 having for example six embedded magnets 4 within it which in this instance are arranged so as to provide six poles which alternate between north and south around the rotor. The rotor therefore defines three direct or d axes evenly spaced around the rotor and three quadrature or q axes interspaced between the d axes. The d axes are aligned with the magnetic poles of the magnets 4 where the lines of magnetic flux from the rotor are in the radial direction, and the q axes are spaced between the d axes where the lines of magnetic flux from the rotor are in the tangential direction.

A stator 6 comprises a nine slot copper wound element having three groups of three teeth 8A, 8B, 8C each group of teeth having a common winding forming a respective phase. There are therefore three electrical cycles in each full rotation of the rotor, and the three teeth 8A, 8B, 8C in any phase are always in the same electrical position as each other.

Figure 4:
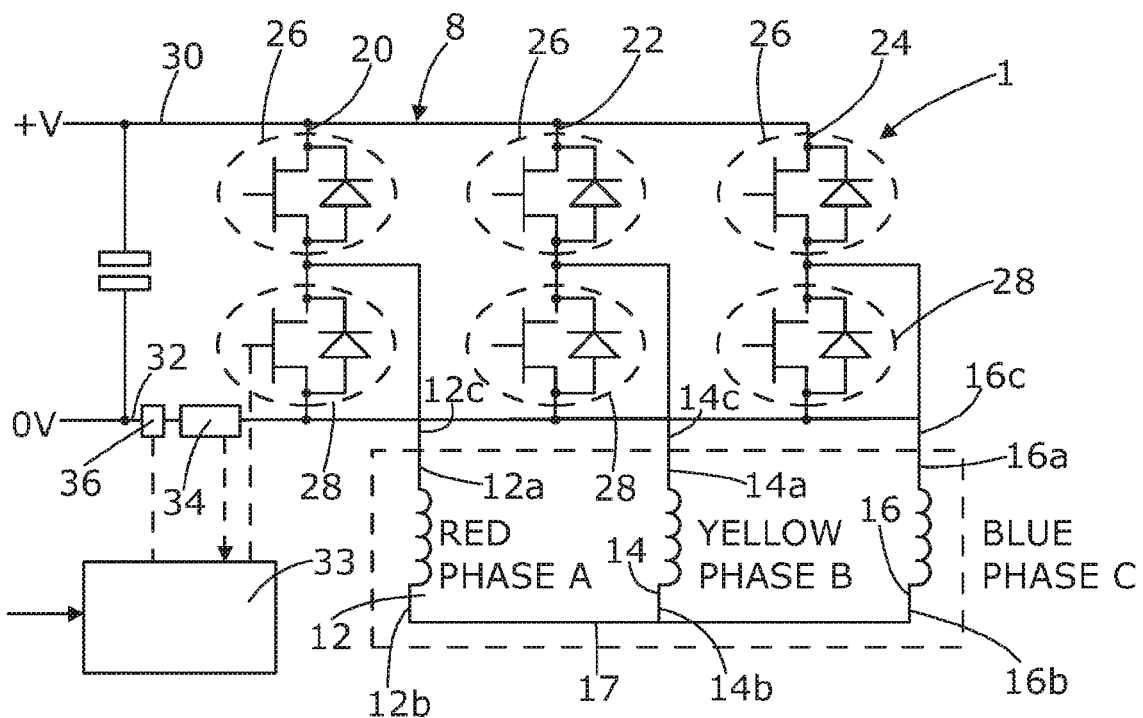
FIG. 4 is representation of the motor and the control system when in use.

Referring to FIGS. 3 and 4, the three motor windings 12, 14, 16, generally designated as phases A, B and C, are connected in a star network. The phase windings are coiled around the stator teeth 8A, 8B, 8C, respectively. One end 12a, 14a, 16a of each coil is connected to a respective terminal 12c, 14c, 16c. The other ends 12b, 14b, 16b, of the coils are connected together to form the star centre 17. A drive circuit comprises switching means including a three phase bridge 18. Each arm 20, 22, 24 of the bridge comprises a pair of switches in the form of a top transistor 26 and a bottom transistor 28 connected in series between a supply rail 30 and ground line 32. The motor windings 12, 14, 16 are each tapped off from between a respective complementary pair of transistors 26, 28. The transistors 26, 28 are turned on and off in a controlled manner by a controller 33 which includes a processing means and optional memory to provide pulse width modulation of the potential applied to each of the terminals 12c, 14c, 16c, thereby to control the potential difference applied across each of the windings 12, 14, 16 and hence also the current flowing through the windings. This in turn controls the strength and orientation of the magnetic field produced by the windings.

A current measuring device in the form of a resistor 34 is provided in the ground line 32 between the motor 1 and ground so that the controller 33 can measure the total current flowing though all of the windings 12, 14, 16. In order to measure the current in each of the windings the total current has to be sampled at precise instants within the PWM period where the voltage applied to each terminal of the winding (and hence the conduction state of a particular phase) is known. A further, optional, sensor 36 which is a di/dt sensor arranged to measure rate of change of current is provided in the ground line 32 in series with the current sensor 34. The di/dt sensor 36 is used to measure the inductance of the phases, and hence the position of the rotor as will be described below. In an alternative, not shown, dedicated positions sensor may be provided which produces an output signal indicative of the relative position of the rotor and stator. This may comprise a rotary encoder.

To determine the current in all three phases it is sufficient to take just two current measurements, as long as the measurements are made at appropriate test periods of time as follows:

1. In a first test period apply a positive voltage, +V, to one phase for sufficient time to determine the current;
2. In a second test period apply a negative voltage, −V, to a different phase for sufficient time to determine the current. The current in the third phase can then be estimated from because the sum of all the three phase currents has to be zero.

The controller 33 is arranged to control the voltages applied to the phases A, B, C using pulse width modulation (PWM) to control the output torque of the motor as will now be described.

Figure 5:
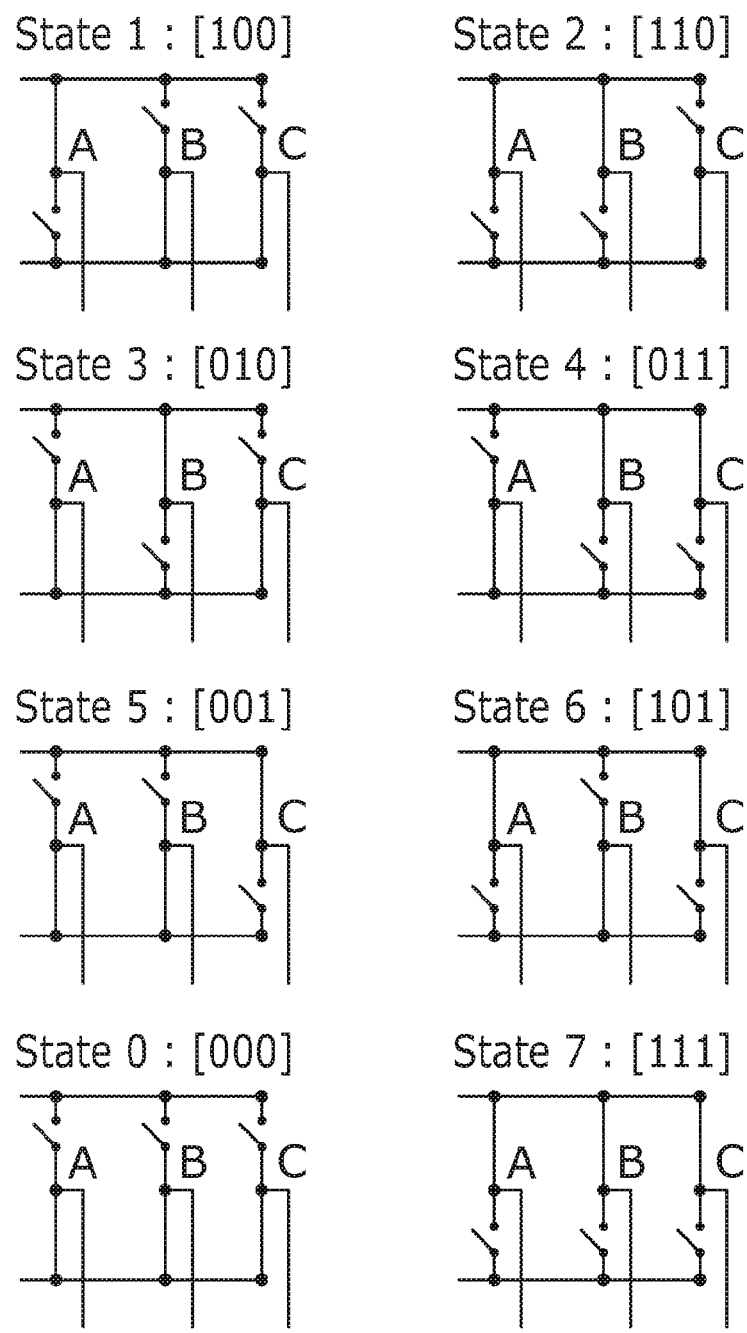
FIG. 5 shows the eight possible SVM states that can be generated and the relative positions of the six bridge switches associated with each SVM state.

Referring to FIG. 5, each winding 2, 4, 6 in a three phase system can only be connected to either the supply rail 20 or the ground line 22 and there are therefore eight possible states of the control circuit. Using 1 to represent one of the phases being at positive voltage and 0 to represent a phase connected to ground, state 1 can be represented as [100] indicating phase A at 1, phase B at 0 and phase C at 0, State 2 is represented as [110], state 3 as [010], state 4 as [011], state 5 as [001], state 6 as [101], state 0 as [000] and state 7 as [111]. Each of states 1 to 6 is a conducting state in which current flows through all of the windings 2, 4, 6, flowing in one direction through one of them and in the other direction through the other two. State 0 is a zero volt state in which all of the windings are connected to ground and state 7 is a zero volt state in which all the windings are connected to the supply rail.

States 1, 2, 3, 4, 5 and 6 are herein also referred to as states +A, −C, +B, −A, +C and −B respectively, because they each represent the states in which the voltage applied across the windings is in a positive or negative direction for a respective one of the phases. For example in the +A state the A phase is connected to the supply rail and the other two phases are connected to the ground link, and in the -A state the connections are reversed.

When the circuit is being controlled to produce pulse width modulation, each of the phases will normally be turned on and off once in each PWM period. The relative lengths of time that are taken up in each state will determine the magnitude and direction of the magnetic field produced in each winding, and hence the magnitude and direction of the total torque applied to the rotor. These lengths of time can be calculated by various modulation algorithms but in this embodiment a space vector modulation technique is used.

PWM patterns that incorporate the positive and negative current measurement voltages, or "test periods" across each of the phases are incorporated into the three-phase PWM waveform by inserting extra non-zero states into the applied PWM voltage pattern. This technique is conveniently described here using Space Vector Modulation (SVM), although any PWM modulation scheme could be adapted to implement the technique. It is notable that each of the six patterns of FIG. 2 includes the two required test periods.

Figure 6:
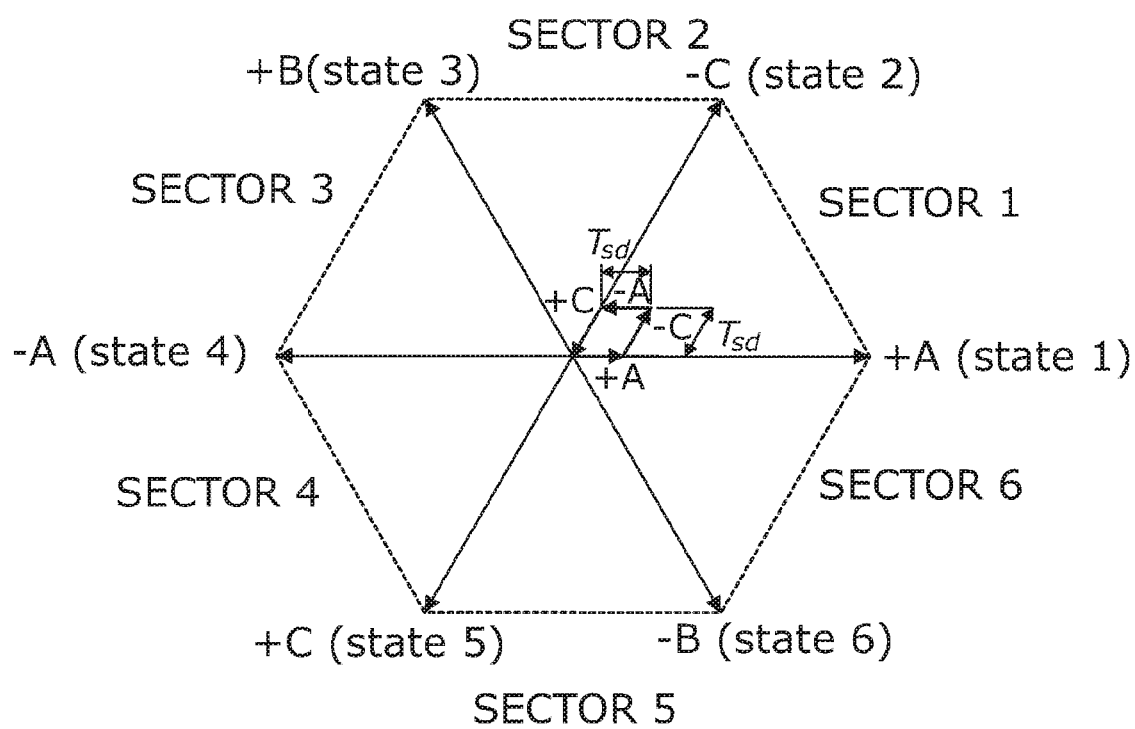
FIG. 6 is a representative Space vector diagram for the voltages required for each phase of the motor under a given torque demand.

Referring to FIG. 6, in state vector modulation systems, the times in each PWM period spent in each of the states are represented as state vectors in a state vector modulation (SVM) diagram. In this type of diagram, single state vectors are those in the directions of the vectors S1 to S6, and the length of the vectors in each of these directions represents the amount of time in each PWM period spent in the respective state.

This means that any desired voltage in the windings can be represented as a point on the diagram which corresponds to a voltage vector which represents the magnitude and direction of the voltage, and can be produced by a combination of state vectors s1, s2, etc. the length of which represent the time in each PWM period spent in that state.

An example of test vectors, which represent the test voltages applied to the windings, is shown in FIG. 6. Here two pairs of test vectors are applied which enables the inductance in two phases (A and C in this case) to be measured simultaneously, i.e. in the same PWM period. This can be used for position sensorless control of the motor. It can be seen that the pattern consists of a positive and negative phase A vector and a positive and negative phase C vector. It will be appreciated that, provided these vectors are the same length, i.e. the time spent in each of states 1 and 4 and in each of states 2 and 5 is the same, the net voltage from the test vectors will be zero.

To measure the current, a finite time is required for the sensors and associated circuitry to settle, and the reading to be taken. The minimum time required to measure the current is herein defined as Tsd Therefore each of the vectors must be of minimum length Tsd as illustrated in FIG. 7.

It can be seen that the test vectors shown in FIG. 6 will also allow the phase currents to be measured using a single current sensor 34 in the ground return of the DC link. The minimum state time required to measure the current in a single sensor system is herein defined as Tsd and to determine the currents in all three phases, the currents in at least two conducting states, which are not opposites of each other, need to be measured. Therefore providing there are two non-zero vectors from two phases of minimum length Tsd the phase currents can be determined in a single PWM period.

Figure 1:
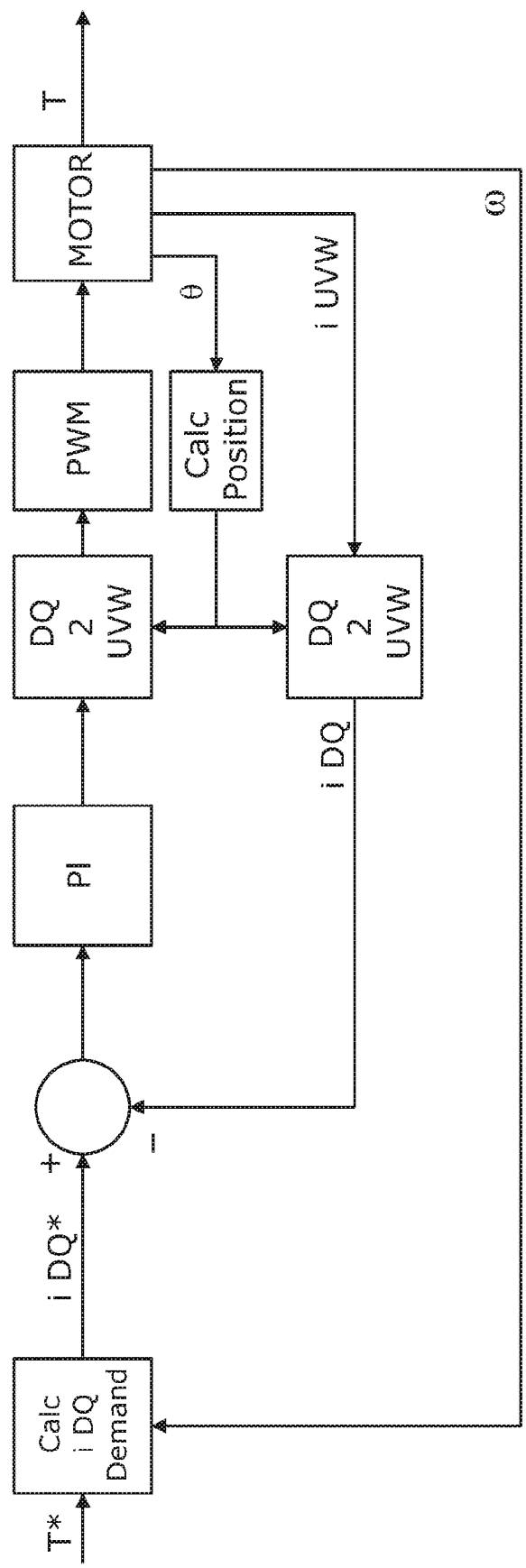
FIG. 1 is a schematic view of an embodiment of a control system for a motor in accordance with the present invention.
Figure 2:
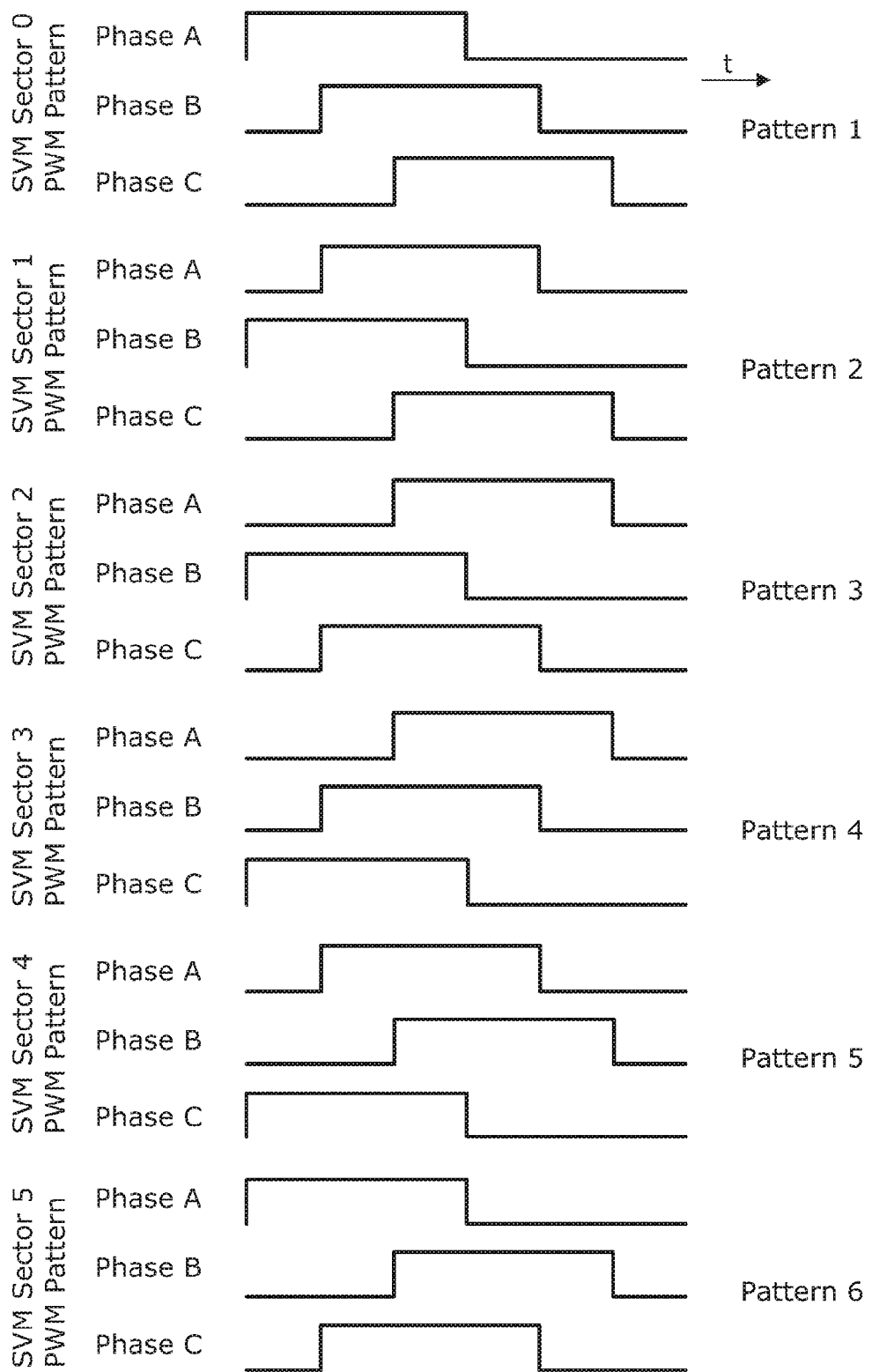
FIG. 2 is a set of six different PWM patterns, each showing PWM voltage against time for each of the three phases of a three phase motor, which are used by the control system.
Figure 7:
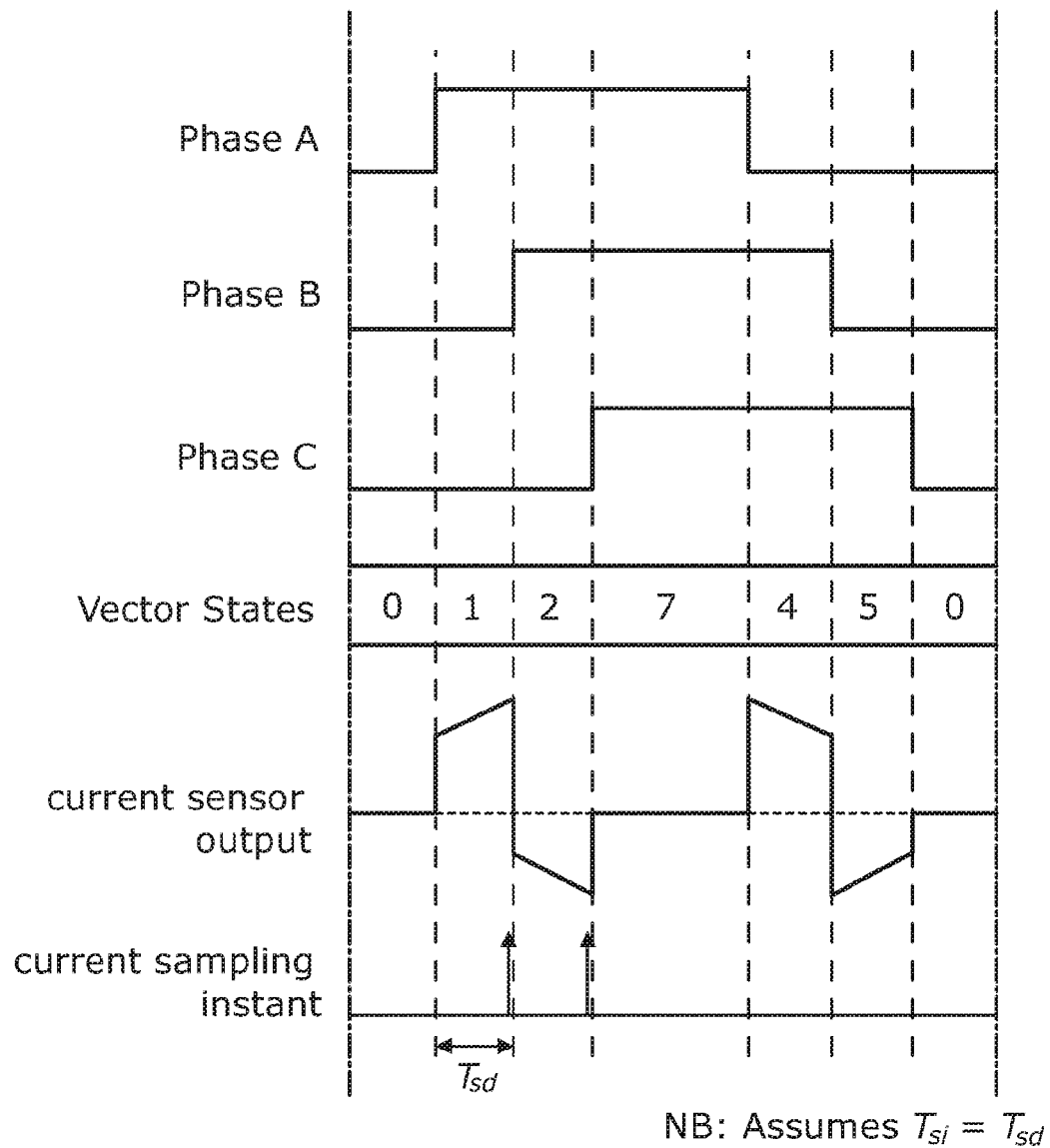
FIG. 7 shows how the voltages of FIG. 6 can be fitted to the first of the PWM patterns shown in FIG. 2 whilst retaining two current test periods.

FIG. 7 shows by upwards facing arrows for one of the PWM patterns of FIG. 2 the location of the two test periods of time in which current measurements can be made. Typical outputs that would be expected for the link-return current sensor 34 and a link-return di/dt sensor 36 are shown. All phase voltages go high-low-high. There are three periods of nonconducting states, two in state 0 and one in state 7, and four conducting states 1, 2, 4 and 5. During the conducting states the rate of change of current di/dt is substantially constant as the current rises at a constant rate. The current magnitude sensor di/dt sensor sample points are towards the end of the respective conducting state periods in which they are made to allow the current to settle after the switch between states.

Rather than using one PWM pattern all the time, all six of the PWM patterns shown in FIG. 2 are used in this embodiment. Each one is assigned to a different range of motor position as will be described later. The patterns are stored in the memory of the controller 33, or are defined by algorithms that can be run by the processing means.

Figure 9:
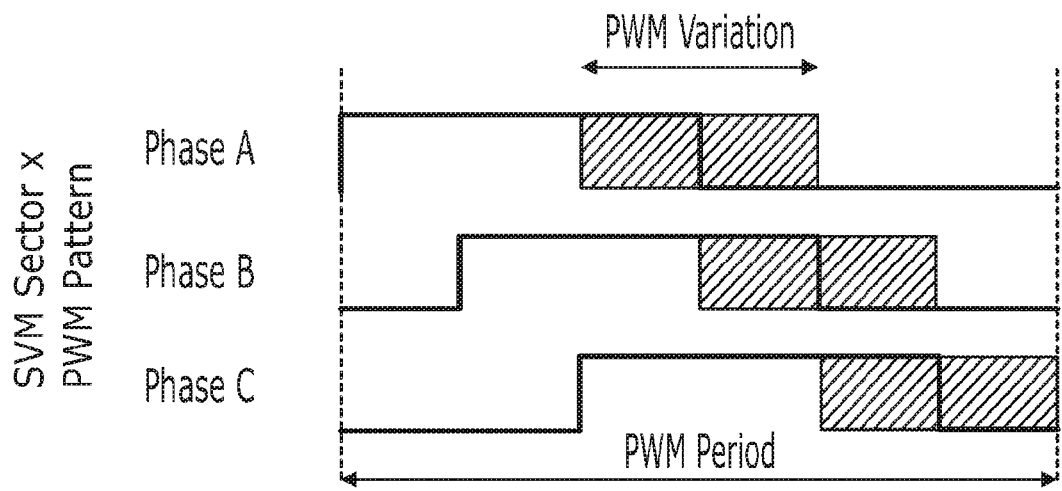
FIG. 9 shows the permissible duty ratios that can be achieved using the first pattern of FIG. 2 whilst retaining the pattern.

At low torques, each of the six possible PWM patterns can be used to realise the state vectors of FIG. 9. The patterns differ only in the order in which the leading edges of the PWM signals are arranged, and by suitable choice of the mark space ratio of each PWM pulse for the phases the same average phase voltages can be applied using any of the six patterns for low torques.

Each pattern in the set of six PWM patterns therefore has certain characteristics in common with the others of the same type. In particular, in this example, a single pulse is applied to each phase within a PWM period, and the leading edges of the three pulses are spaced apart by a set time test, starting with the first pulse aligned with the start of the PWM period. The order of the leading edges varies between the six PWM patterns. The duty ratio for each phase is then varied to apply the demanded phase voltages, keeping the location of the leading edges fixed.

Figure 8:
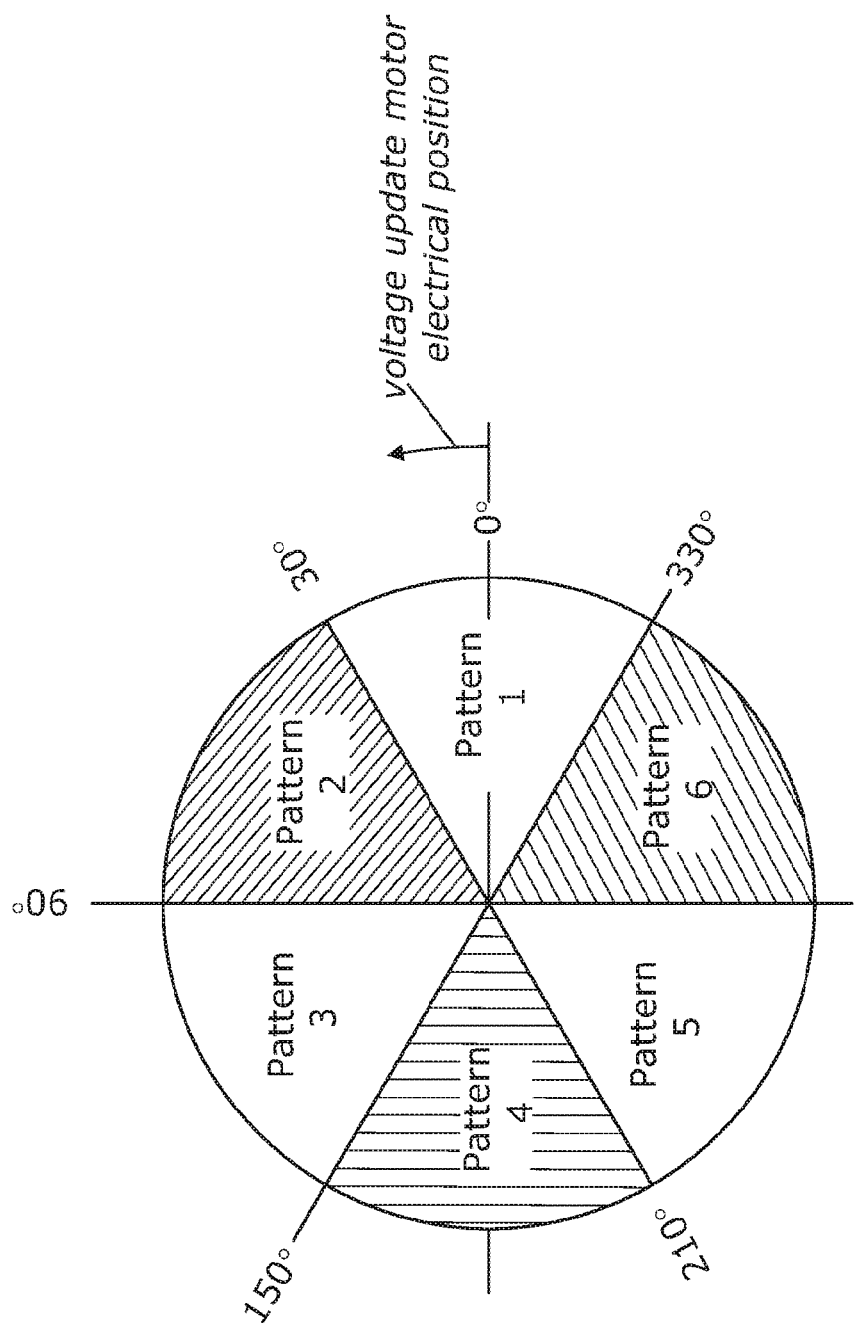
FIG. 8 illustrates the assignment of the six PWM patterns to respective 60 degree ranges of motor position.

Each of the six possible PWM is assigned by the processing means to a different 60 degree range of motor rotor positions. For example, for rotor positions 0-60 degrees the first sector could be used, for 60-119 the second could be used, and so on. This is shown in FIG. 8.

The choice of pattern for each range of motor rotor positions is largely arbitrary at low demanded voltages. The main benefit to changing PWM pattern with angle is that it helps reduce specific harmonics while also helping disguise changes in feel that occur when the sector change. Keeping the same pattern when the motor is held at a given rotor position eliminates the possible risk of the subtle variation in torque and current that can occur when different patterns are used and which may be noticeable. Changing the pattern as the motor rotates removes unwanted harmonics that may otherwise occur.

The applicant has appreciated that the use of an assigned PWM pattern for a given position and forcing a change of pattern only when the rotor has moved to a new range can be rigidly enforced at low torques but that at higher torques the pattern can no longer be chosen arbitrarily. This is because there will be times where the voltages that must be applied to one or more of the phases are either too low or too high for the required sequence of leading edges and trailing edges to be retained. The permitted range of duty ratios is shown in cross hatching in FIG. 9 of the drawings.

Figure 11:
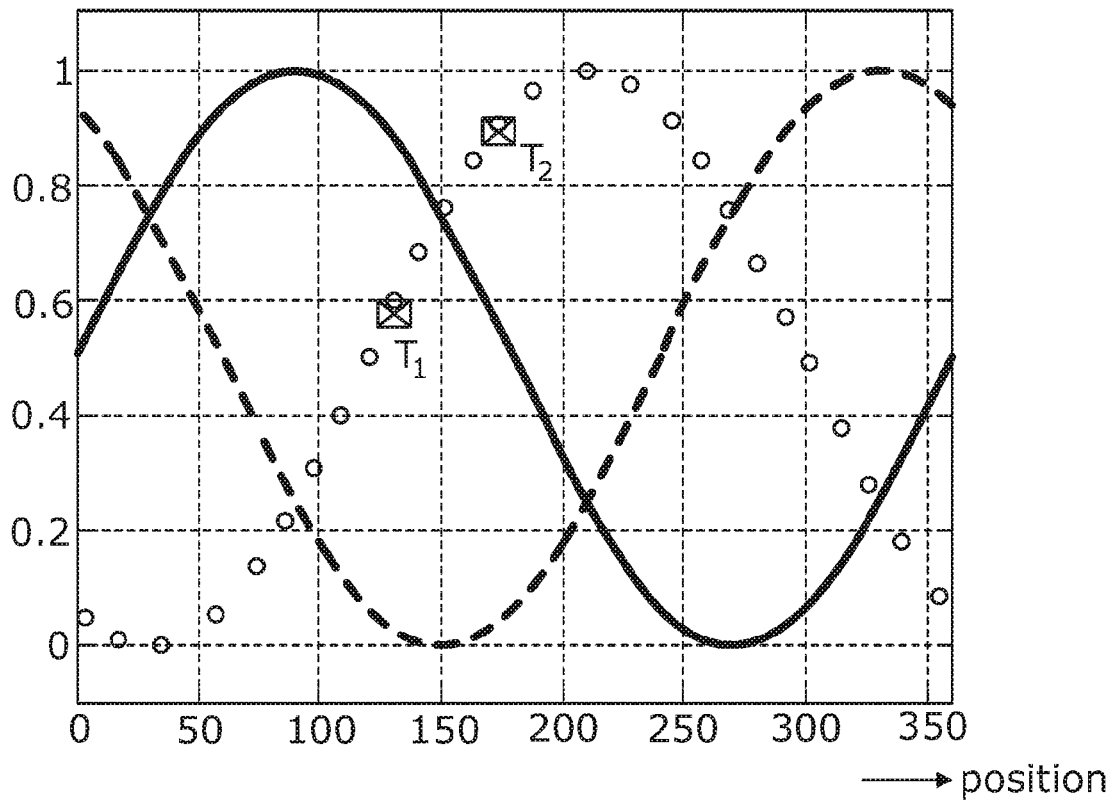
FIG. 11 shows the variation in phase voltage with time during operation of the motor.
Figure 10A:
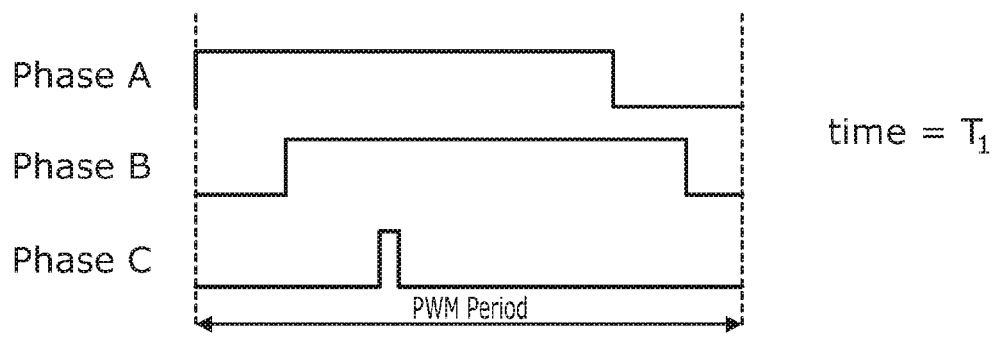
FIG. 10(a) shows a typical set of PWM waveforms using pattern 1 for applying the voltages at time T1 in FIG. 11.
Figure 10B:
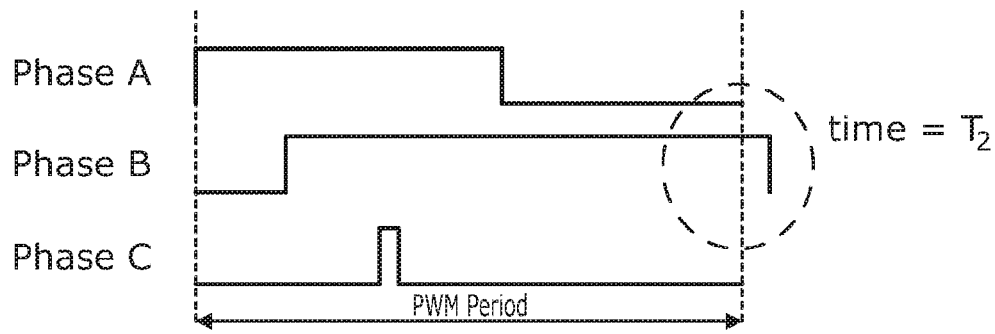
FIG. 10(b) shows the impossible set of required PWM waveforms using pattern for time T2 in FIG. 11.
Figure 10C:
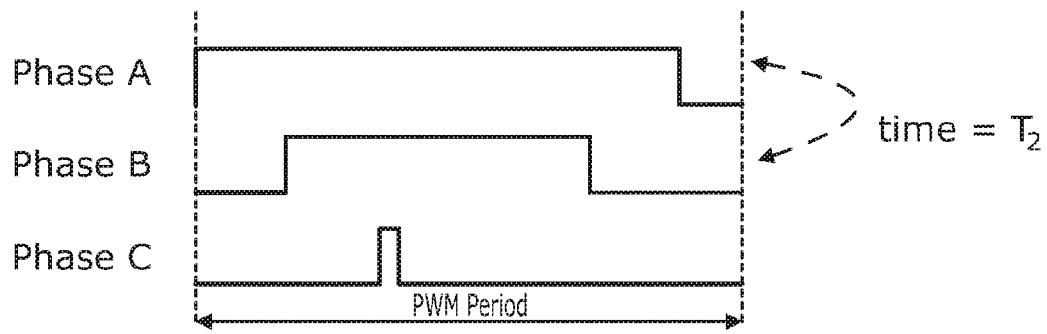
FIG. 10(c) shows how the required voltage waveforms for time T2 can be achieved using the second pattern from FIG. 2.

To illustrate this point, FIG. 10(a) shows a typical set of PWM waveforms using the first pattern of FIG. 2, which can be used to provide the voltages demanded at time T1 (motor position of 140 degrees) in FIG. 11. Some time later, the motor control is required to apply a voltage as shown at time T2 in FIG. 11. FIG. 10b shows how this impossible situation might look. It is clear that the duty ratio of the phase B cannot be achieved for the chosen leading edge location as there is not enough time in the period for the pulse to be accommodated. As such it must move out of the assigned pattern into a different PWM pattern as shown in FIG. 10(b).

In this case the processing means will force a change to the alternative pattern which will allow the voltage pulse to fit and which retains the required testing periods. The requested voltage requires it to be in the second pattern of FIG. 2—this pattern change is required and cannot be avoided.

Following a forced change of pattern, either to accommodate high torques or due to a change in position, the processing means will continue to generate PWM signals using SVM, and to assign those to the most recently used PWM pattern. Therefore it will not revert back to the assigned pattern for the given rotor position even when the demand torque drops to a level that would permit it, only changing when the position moves into the adjacent range of positions. This ensures that the PWM pattern is not constantly changing as torque increases and decreases, which may otherwise produce an unusual feel.

It will be understood that various modifications are possible. In an alternative embodiment that processing means may define a sequence of PWM patterns, and may force a change in pattern to the next one in a sequence whenever the motor rotor has moved though a defined range of angles from a start position. For instance it may force a change in pattern whenever the rotor has moved through 100 degrees, or 50 degrees, or even more than one rotation, e.g. 400 degrees.

The sequence may step through all six PWM patterns shown in FIG. 2 before it repeats. It may be a pseudo random sequence of PWM patterns, or stored sequence of set length which is repeated.

The choice of patterns may also differ from those shown in FIG. 2. For example, PWM patterns can be used which have one, or two or three or more test periods for current measurement, and the patterns may be of the one "type" or may be selected from a mix of different types. A set of only two different patterns may be used, or three or more patterns.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A control system for a multiphase electric motor comprising:
    a controller arranged to monitor electrical currents in the motor and a rotational position of the motor and to determine PWM voltage waveforms to be applied to respective phases of the motor, the PWM voltage waveforms being arranged in a respective PWM pattern; and
    a drive circuit adapted to control current in respective phases of the motor according to the PWM voltage waveforms;
    wherein the controller:
        assigns a chosen PWM pattern from a set of six different PWM patterns to be an assigned PWM pattern for execution based on the position of rotor, based on a PWM period for executing the chosen PWM pattern, and based on a placement of a leading edge of each pulse of the chosen PWM pattern, wherein each pulse of the chosen PWM pattern that is to be applied to a respective phase of phases of the motor has a leading edge that is placed within the PWM period to accommodate a duty ratio of each pulse within the PWM period, each pulse corresponding to a respective one of the PWM voltage waveforms that is to be applied to one of the respective phases of the motor;
        determines that another chosen PWM pattern from the set of six different PWM patterns is to be executed in response to determining that a placement of the leading edge of a respective pulse of the chosen PWM pattern will not accommodate the duty ratio of the respective pulse within a subsequent PWM period;
        assigns the other chosen PWM pattern as the assigned PWM pattern for execution based on the position of the rotor during the subsequent PWM period; and
        maintains the other chosen PWM pattern as the assigned PWM pattern during operation at low duty ratios based on a determination given that there is sufficient time to maintain and execute the other chosen PWM pattern as the assigned PWM pattern during a number of subsequent additional PWM periods at low duty ratios to cause the motor to experience a reduced torque ripple and reduced current disturbances; and
    wherein the six different PWM patterns includes a first PWM pattern which is used when the position of the rotor is between 330 degrees and 30 degrees; a second PWM pattern when the position of the rotor is between 30 degrees and 90 degrees; a third PWM pattern when the rotor position is between 90 degrees and 150 degrees; a fourth PWM pattern when the rotor position is between 150 degrees and 210 degrees; a fifth PWM pattern when the rotor position is between 210 degrees and 270 degrees, and a sixth PWM pattern when the rotor position is between 270 degrees and 330 degrees.

2. The control system according to claim 1 in which the controller is arranged to use a vector control strategy to determine a number of vector states for use in each phase within the PWM period;
    wherein the controller assembles the determined number of vector states using the chosen PWM pattern for the PWM period, and the controller uses the other PWM pattern for the subsequent additional PWM periods until the rotor reaches a different position or range of positions.

3. The control system according to claim 1 in which the controller in use is arranged to assign a predefined PWM pattern for use when the rotor position lies within a range of absolute motor rotational position angles.

4. The control system according to claim 1 in which the assigned PWM patterns of the set of patterns is stored in a memory in a look up table together with the corresponding absolute position or range of absolute positions to which each pattern is assigned.

5. The control system according to claim 3 in which the controller divides a complete motor electrical rotation into six equal angle ranges, and assigns a unique PWM pattern to each of the six ranges, normally selecting the assigned unique PWM pattern whenever the rotor position moves into a range.

6. The control system according to claim 1 in which the controller is adapted to assign a PWM pattern to a relative range of rotor positions.

7. The control system according to claim 1 in which the controller allocates a trailing edge modulated pattern for a given position of range of positions in which a single pulse is applied to each phase during a given PWM period, the duty ratio being defined by the duration of the pulse relative to the PWM period, and in which the leading edges of each pulse are fixed at respective positions within the given PWM period, all the leading edges of each pulse occurring prior to any occurrence of trailing edges of each pulse and defining between the leading edges at least one test period within which current measurements taken.

8. The control system according to claim 1 in which the controller allocates a centre aligned modulation PWM pattern or a leading edge modulated PWM pattern.

9. The control system according to claim 1 in which a respective assigned PWM pattern provides two or more test periods of time within each PWM period within which the current flowing into one phase can be measured.

10. The control system according to claim 1 for a three phase motor in which two test periods of time are provided in a respective assigned PWM pattern, wherein the controller is arranged to measure in a first test period current that flows into one phase and to measure in a second test period the current flowing out of a second one of the phases, the controller estimating the current in a remaining phase from the two current measurements.

11. A control system for a multiphase electric motor comprising:
a controller arranged to monitor electrical currents in the motor and a rotational position of the motor and to determine PWM voltage waveforms to be applied to respective phases of the motor, the PWM voltage waveforms being arranged in a respective PWM pattern; and
a drive circuit adapted to control current in respective phases of the motor according to the PWM voltage waveforms;
wherein the controller:
assigns a chosen PWM pattern from a set of six different PWM patterns to be an assigned PWM pattern for execution based on the position of rotor, based on a PWM period for executing the chosen PWM pattern, and a placement of a leading edge of each pulse of the chosen PWM pattern, wherein each pulse of the chosen PWM pattern that is to be applied to a respective phase of phases of the motor has a leading edge that is placed within the PWM period to accommodate a duty ratio of each pulse within the PWM period, each pulse corresponding to a respective one of the PWM voltage waveforms that is to be applied to one of the respective phases of the motor;
determines that another chosen PWM pattern from the set of six different PWM patterns is to be executed in response to determining that a placement of the leading edge of a respective pulse of the chosen PWM pattern will not accommodate the duty ratio of the respective pulse within a subsequent PWM period;
assigns the other chosen PWM pattern as the assigned PWM pattern for execution based on the position of the rotor during the subsequent PWM period; and
maintains the other chosen PWM pattern as the assigned PWM pattern during operation at low duty ratios based on a determination given that there is sufficient time to maintain and execute the other chosen PWM pattern as the assigned PWM pattern during a number of subsequent additional PWM periods at low duty ratios to cause the motor to experience a reduced torque ripple and reduced current disturbances.

12. The control system according to claim 11 in which the controller allocates a trailing edge modulated pattern for a given position of range of positions in which a single pulse is applied to each phase during a given PWM period, the duty ratio being defined by the duration of the pulse relative to the PWM period, and in which the leading edges of each pulse are fixed at respective positions within the given PWM period, all the leading edges of each pulse occurring prior to any occurrence of trailing edges of each pulse and defining between the leading edges at least one test period within which current measurements are taken.

13. The control system according to claim 11 in which the controller allocates a center aligned modulation PWM pattern or a leading edge modulated PWM pattern.

14. The control system according to claim 12 in which a respective assigned PWM pattern provides two or more test periods of time within each PWM period within which the current flowing into one phase can be measured.

15. A control system for a multiphase electric motor comprising:
a controller arranged to monitor electrical currents in the motor and a rotational position of the motor and to determine PWM voltage waveforms to be applied to respective phases of the motor, the PWM voltage waveforms being arranged in a respective PWM pattern; and
a drive circuit adapted to control current in respective phases of the motor according to the PWM voltage waveforms;
wherein the controller:
assigns a chosen PWM pattern from a set of six different PWM patterns to be an assigned PWM pattern for execution based on the position of rotor, based on a PWM period for executing the chosen PWM pattern, and a placement of a leading edge of each pulse of the chosen PWM pattern, wherein each pulse of the chosen PWM pattern that is to be applied to a respective phase of phases of the motor has a leading edge that is placed within the PWM period to accommodate a duty ratio of each pulse within the PWM period, each pulse corresponding to a respective one of the PWM voltage waveforms that is to be applied to one of the respective phases of the motor;

determines that another chosen PWM pattern from the set of six different PWM patterns is to be executed in response to determining that a placement of the leading edge of a respective pulse of the chosen PWM pattern will not accommodate the duty ratio of the respective pulse within a subsequent PWM period;

assigns the other chosen PWM pattern as the assigned PWM pattern for execution based on the position of the rotor during the subsequent PWM period; and maintains the other chosen PWM pattern as the assigned PWM pattern during a number of subsequent additional PWM periods.

* * * * *